Figure 1:
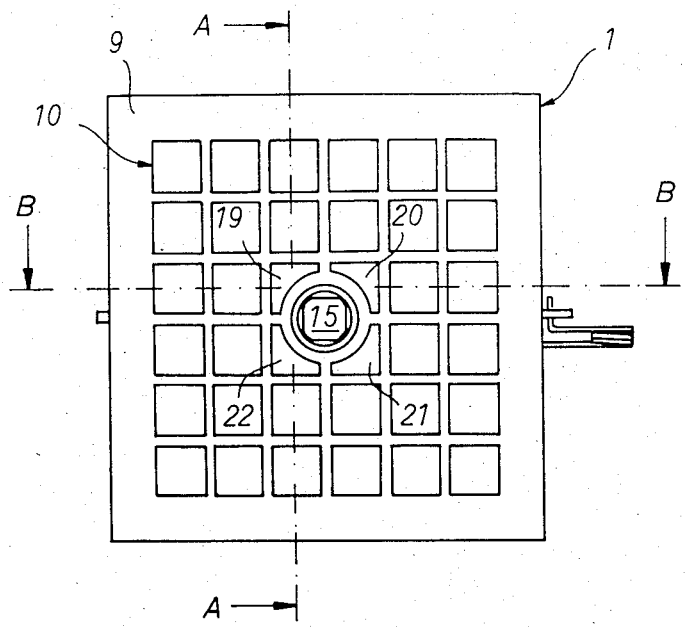

United States Patent [19]

Elfverson

[11] Patent Number: 4,614,151
[45] Date of Patent: Sep. 30, 1986

[54] NOZZLE FOR DISCHARGING VENTILATION AIR FROM A VENTILATION SYSTEM

[75] Inventor: Sven E. Elfverson, Trollhättan, Sweden

[73] Assignee: Saab-Scania Aktiebolag, Trollhattan, Sweden

[21] Appl. No.: 694,455

[22] PCT Filed: May 18, 1983

[86] PCT No.: PCT/SE83/00198
§ 371 Date: Jan. 2, 1985
§ 102(e) Date: Jan. 2, 1985

[87] PCT Pub. No.: WO84/04498
PCT Pub. Date: Nov. 22, 1984

[51] Int. Cl.[4] .......................... B60H 1/34; F24F 13/12
[52] U.S. Cl. ............................................ 98/2; 98/40.24
[58] Field of Search .............. 98/2, 40.01, 40.1, 40.11, 98/40.18, 40.24, 40.26, 40.27, 40.28, 94.2

[56] References Cited

U.S. PATENT DOCUMENTS

| | | | |
|---|---|---|---|
| 2,807,992 | 10/1957 | Ehman | 98/40.24 |
| 2,948,211 | 8/1960 | Melgaard | 98/40.26 |
| 2,976,795 | 3/1961 | Brugler | 98/40.18 |
| 3,461,791 | 8/1969 | Beyer | 98/2 X |
| 3,672,293 | 6/1972 | Gona et al. | 98/40.24 |
| 4,027,407 | 6/1977 | Kiss | 98/40.01 X |

Primary Examiner—Harold Joyce
Attorney, Agent, or Firm—Cushman, Darby & Cushman

[57] ABSTRACT

An outlet nozzle for a ventilation system, including at least one housing with a through-flow duct for ventilation air, a plate transverse the flow direction and fixed to the outlet housing, and a plurality of plates parallel to said fixed plate, these plates being mutually displaceable laterally under the action of a control lever, the plates being formed with a perforation pattern for forming in coaction ventilation ducts through which the ventilation air can flow and in response to the set position of the control lever to allow deflection of the ventilation airflow direction. The control lever is arranged to grip in each displaceable plate a grid cross comprising at least two crossing bars having a substantially circular and elliptical cross section, respectively. The control lever is preferably formed like a turning fork, with a longitudinal slot in each prong, the prongs and the slits holding the bars. This implementation signifies that the control lever, substantially without play, grips the bars, enabling universal setting of the ventilation airflow direction from the outlet nozzle.

5 Claims, 4 Drawing Figures

NOZZLE FOR DISCHARGING VENTILATION AIR FROM A VENTILATION SYSTEM

The present invention relates to a nozzle for discharging ventilation air from a ventilation system, preferably arranged in a vehicle, including at least one outlet housing with a through-flow duct for ventilation air, a plate transverse the flow direction and rigidly attached to the outlet housing, and a plurality of plates parallel to said fixed plate, these plates being mutually displaceable in the transverse direction under the action of a control lever, the plates being formed with perforation patterns, which in coaction form ventilation ducts through which the ventilation air can flow and in response to the setting of the control lever allow deviation of the flow direction of the ventilation air.

For leading ventilation air from a ventilation system to a room or a separate space, e.g. a vehicle passenger compartment, it is usual to equip the outlets from the ventilation system with outlet nozzles. In a vehicle passenger compartment it is also often usual to arrange a plurality of outlets from the ventilation system, these outlets preferably being placed at the floor, windscreen and fascia. The outlet nozzles in the fascia are in this case usually adjustable so that the ventilation air can be distributed in different directions.

It is previously known to implement such an adjustable outlet nozzle in vehicles in the form of adjustable louvres which are pivotably mounted in a rectangular frame, which is in turn articulately attached to a rigid body part or the like. By turning either the louvres and/or the frame, the ventilation air flowing out can be given different directions.

In the known structure mentioned, the necessity of turning the frame by itself and the louvres by themselves is, however, a complicated adjusting procedure for many people. Added to this, the structure contains a large number of parts which require great accuracy in manufacture and assembly to achieve the desired coaction. These conditions result in that such an outlet nozzle is often relatively expensive.

The U.S. Pat. No. 3,672,293 teaches another outlet nozzle which includes a plurality of parallel plates arranged at right angles to the flow direction. These plates are formed as grids, and all the plates have a perforation pattern which in coaction form ventilation ducts. The plates are arranged for parallel displacement relative each other with the aid of a control lever passing through a central hole in each plate. For such displacement, the perforations in the plates will also be displaced, the ventilation ducts being given a deflection which allows airflow in a given direction.

The latter nozzle indeed has obvious advantages in comparison with the nozzle first mentioned, but also has so many obvious disadvantages that the nozzle has not been utilized in practice. Thus, the nozzle requires a comparatively large number of parts which makes the structure expensive to produce. Furthermore, setting of the plates is difficult to carry out with the aid of the control lever, since in different positions it causes play relative to the plates and thereby an inaccurate setting.

The plates in the nozzle according to the cited U.S. Pat. No. 3,672,293 are disposed for mutual engagement under the bias of a compression spring axially surrounding the control lever. With such a coaction, the spring strives to set the plates in a position where they are not displaced relative each other, i.e. in a position corresponding to straight-through passage of the ventilation air. This means that there is risk for the set oblique ventilation position in the nozzle not being maintained due to the spring striving to maintain a central setting.

The present invention has the object of forming an outlet nozzle, advantageous from the flow control aspect, which allows the distribution of ventilation air in a desired direction and at the same time is simple and thereby also cheap to produce. This is enabled by an inventive implementation of the outlet nozzle, which is essentially characterized in that the control lever is adapted to grip round a grid cross formed in each displaceable plate and comprising at least two intersecting bars, of which one bar has a substantially circular cross section, while the other bar has a substantially elliptical cross section.

The invention is preferably distinguished in that the control lever is formed like a tuning fork with a longitudinal slot in either prong, the two prongs of the fork being adapted to grip with clearance bars having a circular cross section in the grid cross of each respective plate, and that the slots in the prongs are adapted to grip bars having a substantially elliptical cross section in each respective grid cross.

The perforation pattern of the plates is preferably a rectangular grid with quadratic interstices with at least one grid cross formed in accordance with the above. The control lever is formed for gripping substantially without play the bars of the grid cross in each plate, and the cross-sectional shape of the bars in question allow universal setting of the control lever to obtain with the outlet nozzle a predetermined maximum ventilation airflow deflection. The mentioned implementations enable exact setting of the respective plates and thereby of the respective ventilation ducts in the outlet nozzle, these settings not being changed without manual actuation of the control lever.

Figure 2:
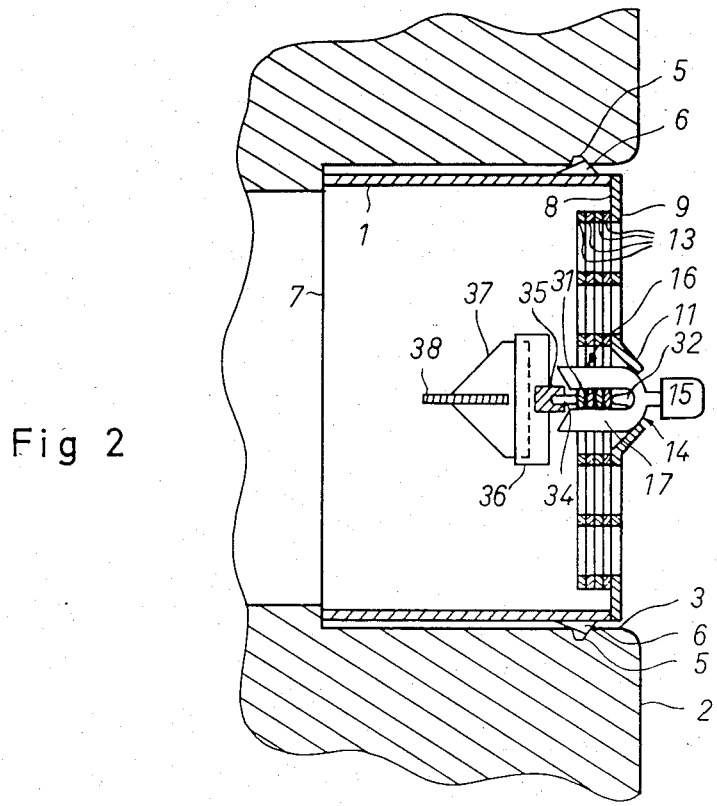
Figure 3:
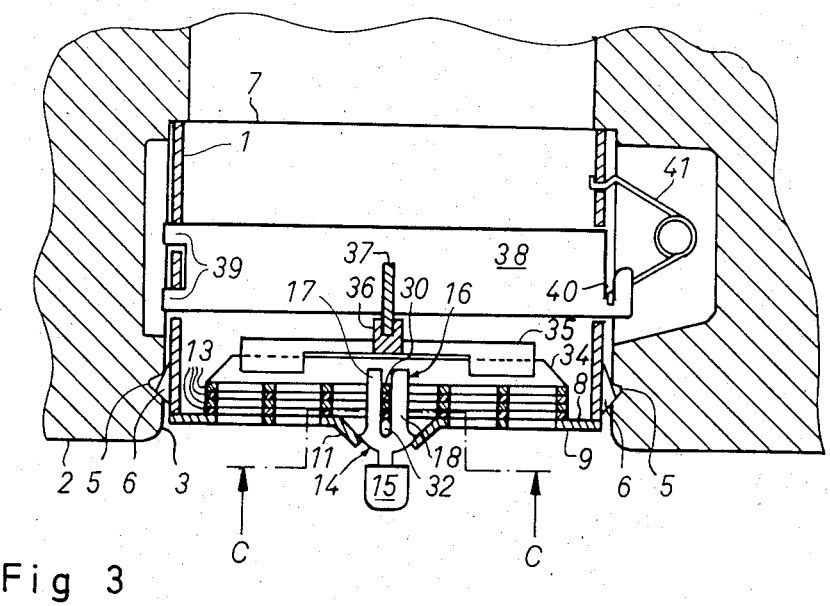
Figure 4:
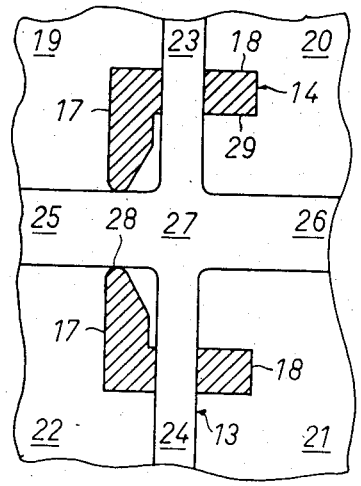

Other distinguishing features of the invention will be apparent from the following description relating to an advantageous embodiment of an outlet nozzle exemplifying the invention in a vehicle ventilation system. The description is made with reference to the accompanying drawings, of which FIG. 1 is a front view of an outlet nozzle, FIG. 2 is a vertical section A—A of the outlet nozzle in FIG. 1, FIG. 3 is a horizontal section B—B of the outlet nozzle in FIG. 1, and FIG. 4 is a cross section C—C according to FIG. 3 to an enlarged scale of a control lever included in the outlet nozzle.

The inventive outlet nozzle includes a housing 1 formed for fitting to a vehicle fascia 2 or the like. Such a fascia 2 is preferably manufactured from a plastics material and formed with a substantially rectangular opening 3 to which is connected a ventilation duct (not shown) at the rear of the fascia, this duct being included in the vehicle ventilation system. Round the forward part of the opening 3, the fascia 2 is formed with a plurality of inward recesses 5 into which a plurality of fastening lugs 6 formed on the outlet housing 1 snap and lock the housing 1 to the fascia 2. The housing 1 and the fastening lugs 6 are preferably manufactured from a plastics material sufficiently resilient for the lugs 6 to be snapped into the respective inward recess 5 in the opening 3.

Both ends 7 and 8 of the outlet housing 1 are open and allow ventilation air to flow through. An outer distribution plate 9 is cemented to the forward end 8 of the housing 1 and is formed with a quadratic perforation pattern 10 so that between the interstices there are formed a plurality of horizontal and vertical bars crossing each other, which may be regarded as forming a grid-like general appearance. A partially spherical bearing shell 11 is formed centrally in the outer distribution plate 9.

On the inside of this outer distribution plate 9, four similar inner distribution plates 13 are arranged in the outlet housing 1 and are formed with the same perforation pattern 10 as the fixed outer distribution plate 9. The inner distribution plates 13 are arranged mutually parallel and parallel to the outer distribution plate 9, the plates 9,13 assuming positions substantially at right angles to the longitudinal direction of the outlet housing 1.

The inner distribution plates 13 are laterally displaceable and their respective positions relative the outer, fixed distribution plate 9 are controlled by a control lever 14 passing through all the inner distribution plates 13. The control lever 14 is formed as a fork 16 like a tuning fork with its two prongs 17,18 each being provided with a longitudinal slot so that four fork legs are formed. Outwardly, the control lever 14 is formed with arcuate hooks and a centrally situated shank which projects through a hole in the bearing shell 11 and to which is attached a knob 15. The fork 16 is preferably manufactured from a molded plastics material and is thus an entity. The implementation enables the control lever 14 to be passed through the inner distribution plates 13 in four central interstices 19–22 adjacent each other in the respective inner plate 13, thereby to grip the bars 23–26 in a grid cross 27 formed between the interstices 19–22.

Such a central grid cross 27 is illustrated in FIG. 4 between the interstices 19–22 in one of the inner distribution plates 13. It is further illustrated how the control lever 14 is arranged to grip the respective bar 23–26 in the grid cross 27. The prongs 17,18 of the control lever 14 grip the vertical bars 23,24 of the grid cross 27 on either side of the intersection of the cross, while a slot 28 in one prong 17 grips a horizontal bar 25. A second slot 29 in the other prong 18 is adapted to pass over the other horizontal bar 26 in the cross 27, but this slot 29 is sufficiently wide so as not to come into engagement with the horizontal bar 26.

The vertical bars 23,24 in the grid cross 27 have a circular cross-sectional area 30, as is apparent from FIG. 3, while the horizontal bars 25,26 have an elliptical cross-sectional area 31, as is apparent from FIG. 2. The remaining grid crosses included in the perforation pattern 10 of the plates 13 include bars with a substantially quadratic cross-sectional area.

According to FIGS. 2 and 3, the fork 16 is fitted from the outside and inwards, but according to the inventive concept it is also possible to form the fork 16 for the reversed direction of assembly.

The fork 16 is formed with a base uniting the prongs 17,18 which has the exterior shape of a part sphere which is mounted in the bearing shell 11 in the outer distribution plate.

An abutment 32 extends inwards from the base of the fork 16 on the inside and between the prongs 17,18 of the fork, this abutment being adapted to engage against the grid cross 27 on the inner distribution plate 13 nearest to the outer distribution plate 9.

The innermost of the inner distribution plates 13 is formed on its inward surface with a horizontal flange 34, adapted to coact with a guide cross 35,36. For this purpose the guide cross 35,36 includes a horizontal bar 35 with a horizontal guide groove accommodating the flange 34, thereby affording displaceable mounting to the plates 13. The guide cross 35,36 also includes a vertical bar 36 with a vertical groove glidably accommodating a vertical flange 37 integral with a pressure plate 38. This pressure plate 38 is horizontally disposed in the housing 1 and at one end it is provided with two prongs 39 accommodated in complementary holes in the housing 1. The other end of the pressure plate 38 is accommodated with clearance in a corresponding recess in the housing 1. This end of the pressure plate 38 is formed with a slot 40 for receiving one end of a spring 41 the other end of which is attached to the housing 1. The spring 41 urges the pressure plate 38 outwards, which in turn, via the guide cross 35,36, urges the distribution plates 13 outwards and into mutual engagement.

Setting the desired outflow direction of the ventilation air through the fascia outlet is carried out with the control lever 14. As previously mentioned, the control lever is mounted in the bearing shell 11 in the outer, fixed distribution plate 9 and engages round the grid crosses 27 formed in the inner distribution plates 13, and obtains pivotable mounting about corresponding bars 23–26. For such a pivoting movement, the inner distribution plates 13 are given parallel displacement so that the perforation patterns 10 arranged in the distribution plates 9,13 form deflecting ventilation ducts which can lead the ventilation air in a direction substantially coinciding with the longitudinal direction set for the control lever 14.

In displacing the control lever 14 horizontally, the fork 16 is pivoted about the vertical bars 23,24 in the grid cross 27, these bars 23,24 having a circular cross section 30 with a diameter approximately as great as the distance between the prongs 17,18 of the control lever 14.

In displacing the control lever 14 vertically, the fork 16 is pivoted about the horizontal bars 25,26 in the grid cross 27, these bars 25,26 having an elliptical cross section 31 with its long axis parallel to the distribution plates 13 and its short axis at right angles to the distribution plates 13. The slot 28 arranged in the fork 16 of the control lever 14, this slot gripping round the horizontal bar 25, has a width substantially in agreement with the length of the long axis of the elliptical cross section 31.

The cross-sectional shapes described for the bars 23–26 allow the conical lever 14 simultaneously to be displaced maximally both vertically and horizontally, thereby enabling universal setting of the outlet nozzle.

Simultaneously with the control lever 14 being pivoted horizontally and/or vertically, the guide cross 35,36 glides relative the horizontal flange 34 and the vertical flange 37, respectively. It is thereby ensured that the distribution plates 13 are urged against each other in all setting positions. On the other hand, transverse forces parallel to the plates 13 cannot be transferred from the spring or the pressure plate 38, which ensures that the plates 13 are not unintentionally displaced hereby.

The invention is not limited to the exemplified embodiment but may be modified and applied in alternative embodiments within the scope of the following claims.

I claim:

1. A nozzle for discharging ventilation air from a ventilation system, preferably arranged in a vehicle, including at least one outlet housing with a throughflow duct for ventilation air, a fixed plate transverse to the flow duct and rigidly attached to the outlet housing, and a plurality of plates parallel to said fixed plate, these plates being mutually displaceable in a direction transverse to the flow duct under the action of a control lever passing through the plates, the plates being formed with perforation patterns, which in coaction form ventilation ducts through which the ventilation air can flow and in response to the setting of the control lever cause deviation of the flow direction of the ventilation air, wherein each displaceable plate is formed with a grid cross comprising at least two intersecting bars, of which one bar has a substantially circular cross section, while the other bar has a substantially elliptical cross section and wherein the control lever is adapted to grip round a grid cross, the control lever having two pairs of longitudinal slots, one pair of said slots being adapted to grip without play one of the intersecting bars in each respective grid cross, said other pair of slots comprising a first slot adapted to grip without play the other of the intersecting bars, and a second slot formed with a width disabling engagement with the other of the intersecting bars.

2. A nozzle as claimed in claim 1, wherein oval cross section bars have elliptical cross section, the long axis of the ellipse being parallel to the plates (13).

3. A nozzle as claimed in claim 1, wherein the fixed plate and the displaceably arranged plates are formed with the same quadratic perforation pattern, and wherein said displaceably arranged plates are formed with the same cross sections on the bars included therein.

4. A nozzle as claimed in claim 1, wherein a spring is adapted for urging the plates into mutual engagement, and in that one end of the spring is attached to the outlet housing, while the other end engages in a pressure plate displaceably mounted in the outlet housing for urging the plates outwards.

5. A nozzle as in claim 1 wherein the control lever has the shape of a tuning fork, said one pair of slots being formed by a longitudinal slot in each prong and adapted to grip grid bars of circular cross section, wherein said first slot of said other pair of slots is adapted to grip bars of oval cross-section, and wherein said second slot of said other pair of slots has said engagement-disabling width.

* * * * *